US008233475B2

(12) United States Patent
Ajero et al.

(10) Patent No.: US 8,233,475 B2
(45) Date of Patent: Jul. 31, 2012

(54) DEVICE INITIATED DQOS SYSTEM AND METHOD

(75) Inventors: Don Philip Ajero, American Canyon, CA (US); Chih-Ping Lee, Cupertino, CA (US); Nan-Sheng Lin, Fremont, CA (US)

(73) Assignee: Innomedia Pte Ltd, Singapore (SG)

( * ) Notice: Subject to any disclaimer, the term of this patent is extended or adjusted under 35 U.S.C. 154(b) by 210 days.

(21) Appl. No.: 12/806,755

(22) Filed: Aug. 20, 2010

(65) Prior Publication Data
US 2012/0044930 A1 Feb. 23, 2012

(51) Int. Cl.
*H04L 12/66* (2006.01)
*H04J 3/16* (2006.01)
(52) U.S. Cl. ........................................ 370/352; 370/467
(58) Field of Classification Search .................. 370/352, 370/467
See application file for complete search history.

(56) References Cited

U.S. PATENT DOCUMENTS

| | | | | |
|---|---|---|---|---|
| 7,103,067 | B1 * | 9/2006 | Singh et al. | 370/467 |
| 7,693,180 | B1 * | 4/2010 | Singh et al. | 370/466 |
| 7,738,440 | B2 * | 6/2010 | Riley et al. | 370/348 |
| 7,787,418 | B2 * | 8/2010 | Chou | 370/329 |

OTHER PUBLICATIONS

Chapman et al., TelePresence over DOCSIS, Apr. 2009, pp. 11 and 18.*
PacketCable, Business SIP (BSS) Feature Specification, PKT-SP-BSSF-I03-100527, CableLabs, May 27, 2010.*

* cited by examiner

*Primary Examiner* — Asad M Nawaz
*Assistant Examiner* — Nicholas Jensen
(74) *Attorney, Agent, or Firm* — Timothy P. O Hagan

(57) ABSTRACT

A Data-Over-Cable Service Interface Specification (DOCSIS) cable modem system is coupled to: i) via a local area internet protocol (IP) network, a voice over internet protocol (VoIP) device operating Session Initiation Protocol (SIP) for signaling a VoIP media session; and ii) via a DOCSIS network, a cable modem termination system (CMTS) via a network. The cable modem system comprises instructions stored in a memory and executed by a processor. The instructions comprise: i) in response to receiving a frame via the local area IP network, determining if the frame is a Session Initiation Protocol (SIP) invite message signaling a VoIP session with a remote endpoint; and ii) in response to determining that the frame is a SIP invite message, generating a DOCSIS message to the CMTS to request an addition of reserved bandwidth on the DOCSIS network for the VoIP session.

5 Claims, 11 Drawing Sheets

DEVICE INITIATED DQOS SYSTEM AND METHOD

TECHNICAL FIELD

The present invention relates to the management of Dynamic Quality of Service (DQoS) in a hybrid fiber/cable (HFC) network operating pursuant to the Data over Cable Service Interface Specification (DOCSIS), and more particularly for providing DQoS for a Voice over Internet Protocol (VoIP) device which lacks the ability to request DQoS allocation and commitment of resources from the Cable Modem Termination System (CMTS) managing resources within the HFC.

BACKGROUND OF THE INVENTION

For many years voice telephone service was implemented over a circuit switched network commonly known as the public switched telephone network (PSTN) and controlled by a local telephone service provider. In such systems, the analog electrical signals representing the conversation are transmitted between the two telephone handsets on a dedicated twisted-pair-copper-wire circuit. More specifically, each telephone handset is coupled to a local switching station on a dedicated pair of copper wires known as a subscriber loop. When a telephone call is placed, the circuit is completed by dynamically coupling each subscriber loop to a dedicated pair of copper wires between the two switching stations.

Recently, voice telephone service has been implemented over the Internet. Advances in the speed of Internet data transmissions and Internet bandwidth have made it possible for telephone conversations to be communicated using the Internet's packet switched architecture. In one example, a cable service operator may include a multi-media terminal adapter (MTA) with one or more FXS ports embedded with the DOCSIS cable modem system and use a call management server (CMS) provide telephone service using IP packets over the operator's hybrid fiber-coaxial (HFC) network.

A problem with use of the Internet's packet switch architecture is that when Internet traffic load is high, packets can be significantly delayed in router buffers or even dropped when router buffers "overflow". Packet delays and dropped packets significantly degrade audio quality of services (QOS)—well below audio QOS provided by the PSTN.

To improve the quality of service for audio calls with the goal of enabling cable service operators to provide reliable telephone service across their HFC networks, DOCSIS includes a Dynamic Service Flow scheme which dynamically provides dedicated bandwidth at predetermined time intervals to support a telephone conversation.

In an existing implementation utilizing CableLabs PacketCable 1.0/1.5, DQoS involves the CMS using Common Open Policy Service (COPS) protocol to communicate with the Cable Modem Termination System for resource reservation, and Network Control Signaling (NCS) to instruct the cable modem embedded with the MTA to utilize DOCSIS Dynamic Service Flow messages to request that the Cable Modem Termination System controlling the HFC network allocate and commit sufficient bandwidth for a telephone conversation.

More specifically, when the MTA detects that a telephone device coupled to one of it's FXS ports is taken off hook, NCS signaling is used to notify the CMS of such an event. The CMS, communicates directly with the CMTS to reserve resources for the MTA and uses NCS signaling to instruct the MTA to create the connection and request allocation and commitment of bandwidth via the embedded DOCSIS cable modem using DOCSIS Dynamic Service Flow messages.

In another existing implementation for non-NCS systems, the DQoS resource reservation and commitment are done by network based servers communicating directly with the CMTSs under the CableLabs PacketCable Multimedia (PCMM) architecture.

A problem exists in that the DQoS mechanism described above is available only for devices wherein a CMS Server or network based serves in the PCMM architecture are available managing the reservation of bandwidth with the CMTS. DQoS is unavailable for non-NCS VoIP devices which either have an embedded DOCSIS cable modem or may be coupled to a local area network supported by a cable modem.

What is needed is a system and method that enables use of DQoS by VoIP devices (whether embedded with the cable modem or coupled to the cable modem by a local area network) without requiring NCS messaging with a CMS server or the network infrastructure of PCMM.

SUMMARY OF THE INVENTION

A first aspect of the present invention comprises a Data-Over-Cable Service Interface Specification (DOCSIS) cable modem system coupled to a cable modem termination system (CMTS) via a DOCSIS network and providing Dynamic Quality of Service (DQoS) in response to initiation by a Voice over Internet Protocol (VoIP) device.

The VoIP device may be a device which does not use Network Control Signaling (NCS) which enables a Call Management Server (CMS) to initiate DQoS. The VoIP device may be such a non-NCS device utilizing Session Initiation Protocol (SIP) for call set up and tear down and may be embedded with the cable modem or may be coupled to the cable modem via a local area internet protocol (IP) network.

The cable modem may comprise instructions stored in a memory and executed by a processor. The instructions execute by the cable modem comprise generating a DOCSIS message to the CMTS to request an addition of reserved bandwidth on the DOCSIS network for the VoIP session in response to receiving an instruction to request an addition of reserved bandwidth from the VoIP device. The instruction may be an IP frame received via the local area network with a payload of the IP frame being an application level instruction to request an addition of reserved bandwidth.

The instructions executed by the cable modem may further comprise generating a DOCSIS message to the CMTS to request a change of reserved bandwidth on the DOCSIS network to commit reserved bandwidth for the VoIP session in response to receiving an instruction to request such a change from the VoIP device. The instruction to request the change may be an IP frame received via the local area network with a payload of the IP frame being an application level instruction to request such a change of reserved bandwidth.

The instructions executed by the cable modem may further comprise generating a DOCSIS message to the CMTS to request a change of deletion or release of reserved bandwidth on the DOCSIS network in response to receiving an instruction to delete or release reserved bandwidth from the VoIP device. The instruction to request the deletion or release of reserved bandwidth may be an IP frame received via the local area network with a payload of the IP frame being an application level instruction to request such deletion or release.

In a second aspect of the present invention, a VoIP device may, for controlling DQoS, include instructions stored in a memory and executed by a processor, the instructions may include instructing a DOCSIS cable modem system communicating with a CMTS to generate a DOCSIS message to the CMTS to request reservation of bandwidth on the DOCSIS network for a VoIP session.

The instructions may further include waiting for a response from the cable modem system acknowledging reservation of bandwidth on the DOCSIS network for a VoIP session and, only upon receiving a response from the cable modem acknowledging reservation of bandwidth, generating Session Initiation Protocol signaling to initiate the VoIP session. This assures that bandwidth is available before initiating the VoIP session via SIP.

The instructions may further include instructing the DOCSIS cable modem system to request a change of reserved bandwidth on the DOCSIS network to commit reserved bandwidth for a VoIP session upon the VoIP device being ready to commence a real time protocol (RTP) stream of a media session.

The instructions may further include waiting for a response from the cable modem system acknowledging the change of bandwidth on the DOCSIS network for a VoIP session, and only upon receiving a response from the cable modem acknowledging the change of bandwidth, generating Session Initiation Protocol OK messaging to initiate the RTP stream.

The instructions may further include, upon termination of the RTP stream between the VoIP device and a remote VoIP device, instructing the DOCSIS cable modem system to generate a DOCSIS message to the CMTS to request a deletion or release of reserved bandwidth on the DOCSIS network.

In yet another aspect of the present invention, a DOCSIS cable modem system may be coupled to: i) a voice over internet protocol (VoIP) device operating Session Initiation Protocol (SIP) for signaling a VoIP media session; and ii) a CMTS via a DOCSIS network.

In this aspect, the cable modem system may comprise instructions stored in a memory and executed by a processor to: i) in response to receiving a frame via the local area IP network, determining if the frame is a Session Initiation Protocol (SIP) invite message signaling a VoIP session with a remote endpoint; and ii) in response to determining that the frame is a SIP invite message, generating a DOCSIS message to the CMTS to request an addition of reserved bandwidth on the DOCSIS network for the VoIP session.

The instructions may further include: i) in response to receiving a frame via the local area IP network, determining if the frame is a Session Initiation Protocol (SIP) OK message signaling commencement of a real time protocol stream between the VoIP device and the remote endpoint; and ii) in response to determining that the frame is a SIP OK message, generating a DOCSIS message to the CMTS to request a change of reserved bandwidth on the DOCSIS network to commit reserved bandwidth for the VoIP session.

The instructions may further yet include: i) in response to receiving a frame via the local area IP network, determining if the frame is a Session Initiation Protocol (SIP) BYE message signaling termination of a real time protocol stream between the VoIP device and the remote endpoint; and ii) in response to determining that the frame is a SIP BYE message, generating a DOCSIS message to the CMTS to request a deletion of reserved bandwidth on the DOCSIS network.

In yet another aspect, the present invention comprises a session boarder control circuit (SBC). The CM/SBC is coupled to: i) a voice over internet protocol (VoIP) device via a local area network; and ii) an embedded cable modem circuit (CM) for communication with a cable modem termination system (CMTS) via a Data-Over-Cable Service Interface Specification (DOCSIS) network.

The SBC comprises, as instructions stored in a memory and executed by a processor, a back to back user agent system (B2BUA) embedded with a DOCSIS dynamic quality of service system (DQoS).

The B2BUA, in response to receiving a packet via the local area network, determines if the frame is a Session Initiation Protocol (SIP) invite message. In response to the B2BUA determining that the packet is a SIP invite message, the DQoS: i) generates a dynamic service addition Request message (DSA-REQ) to the CMTS; and ii) awaits a dynamic service addition response message (DSA-RSP) from the CMTS. The DSA-RSP being generated by the CMTS in response to the DSA-REQ if the CMTS allocates resources for the SBC. The B2BUA, only subsequent to the DQoS receiving the DSA-RSP, generates a corresponding SIP invite message to a SIP proxy. As such, the corresponding SIP invite message is only generated after the SBC has confirmed an allocation of bandwidth from the CMTS to support the potential call.

In response to the B2BUA receiving a SIP OK message from the SIP proxy the DQoS generates a dynamic service change request (DSC-REQ) to the CMTS and awaits receiving a dynamic services change response message (DSC-RSP) from the CMTS.

The B2BUA, only subsequent to the DQoS receiving the DSC-RSP, generates a corresponding SIP OK message to the VoIP device via the local area network. As such, the corresponding SIP OK message is only generated after the SBC has confirmed a commitment of bandwidth from the CMTS to support the eminent call.

For a better understanding of the present invention, together with other and further aspects thereof, reference is made to the following description, taken in conjunction with the accompanying drawings. The scope of the present invention is set forth in the appended claims.

DETAILED DESCRIPTION OF THE EXEMPLARY EMBODIMENTS

Figure 1:
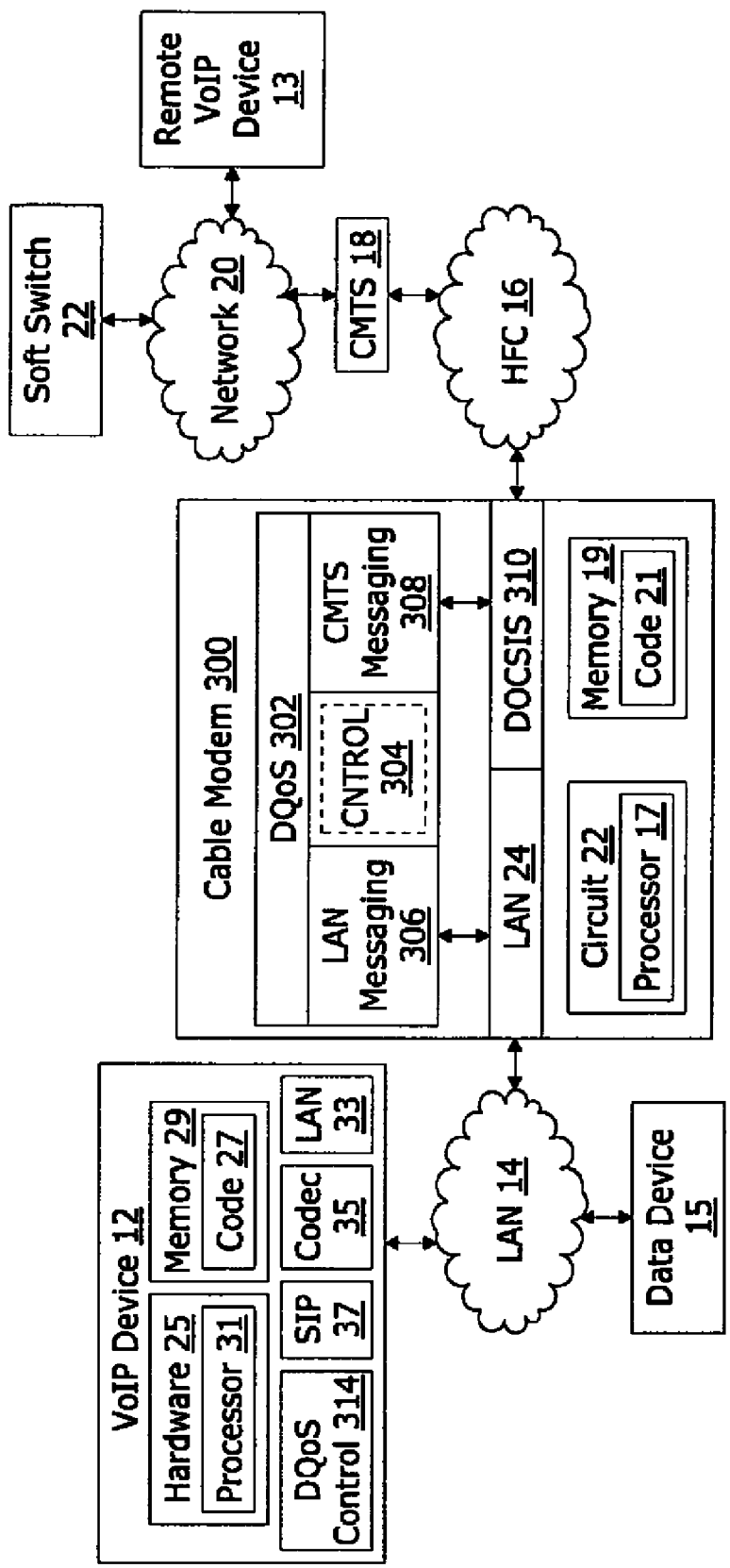
FIG. 1 is an architecture diagram representing an aspect of the present invention.

The present invention will now be described in detail with reference to the drawings. In the drawings, each element with a reference number is similar to other elements with the same reference number independent of any letter designation following the reference number. In the text, a reference number with a specific letter designation following the reference number refers to the specific element with the number and letter designation and a reference number without a specific letter designation refers to all elements with the same reference number independent of any letter designation following the reference number in the drawings.

It should also be appreciated that many of the elements and systems discussed in this specification may be, or may be implemented in, a hardware circuit(s), a processor executing software code, or a combination of a hardware circuit(s) and a processor or control block of an integrated circuit executing machine readable code. As such, the term circuit, module, server, or other equivalent description of an element as used throughout this specification is intended to encompass a hardware circuit (whether discrete elements or an integrated circuit block), a processor or control block executing code, or a combination of a hardware circuit(s) and a processor and/or control block executing code.

More specifically, with reference to FIG. 1, and without limiting the generality of the foregoing, each of the following elements of a Cable Modem 300 may be implemented as a combination of hardware circuits 22 and code 21 (i.e. processing steps) stored in a volatile or non-volatile memory 19 executed by the hardware circuits 22, inclusive of a processor 17: i) a Local Area Network (LAN) system 312, ii) a DOCSIS Cable Modem (CM) system 310; and iii) a Dynamic Quality of Service (DQoS) module 302. The DQoS module 302 may include LAN messaging 306, CMTS messaging 308, and optionally a control module 304.

The Cable Modem 300 may be coupled to a VoIP device 12 via a local area network (LAN) 14 and coupled to a Cable Modem Termination System (CMTS) via cable service provider's DOCSIS compliant Hybrid Fiber/Coax (HFC) network 16.

The LAN 14 may be a wired or wireless IP complaint network wherein all devices are assigned IP addresses within the domain of IP addressed assigned to local networks and which are un-routable over the Internet, for example 192.168.XXX.XXX. In an exemplary embodiment the Cable Modem 300 functions as a gateway for Internet traffic between devices coupled to the LAN 14 (including the VoIP device 12 and traditional data devices 15) and other IP devices coupled to other networks across the Internet.

An exemplary VoIP device 12 may include a traditional VoIP telephone or a traditional computer running a VoIP application. Without limiting the generality of the first and second paragraphs of this section (Detailed Description of the Exemplary Embodiments) or the previous sentence, each of the following elements of the VoIP device 12 may be implemented as a combination of hardware circuits 25 and code 27 (i.e. processing steps) stored in a volatile or non-volatile memory 29 executed by the hardware circuits 25, inclusive of a processor 31: i) a Local Area Network (LAN) system 33; ii) analog audio/CODEC system 35; iii) a Session Initiation Protocol (SIP) system 37; and iv) optionally a DQoS control system 314.

The LAN system 33 communicates IP frames with remote devices over the LAN 14 at all layers below the application layer. The SIP system 37 is an application which utilizes the Session Initiation Protocol to set up and tear down media sessions (i.e. Real Time Protocol (RTP) streams) for VoIP calls between the VoIP device 12 and a remote VoIP device (such as VoIP device 13) by exchanging SIP complaint messages with a remote SIP proxy server such as a Softswitch 22. The analog audio/CODEC system 35 converts between: i) analog audio input from a microphone and output by a speaker coupled to the VoIP device 12; and ii) compressed digital audio frames exchanged with the remote VoIP device 13 during the media session as an RTP stream.

The CMTS 18 is a traditional CMTS operating in compliance with DOCSIS to exchange data with the cable modem 300 (and each other cable modem) coupled to the HFC network 16—including operating in compliance with DQoS protocols to add, change, and delete dedicated bandwidth at dedicated intervals (i.e. resources) to assure audio quality in a VoIP session over the HFC network 16.

An example of adding dedicated or reserved bandwidth includes an allocation or reservation of bandwidth for a prospective RTP stream and the terms are used interchangeably throughout this application. The term bandwidth refers to availability of the network, or communication capabilities or bandwidth of the network for communication of a frame of a predetermined size, at predetermined intervals to support an RTP stream. Similarly, an example of changing dedicated bandwidth includes commitment of bandwidth (i.e. commitment of communication capabilities or bandwidth of the network at predetermined intervals) to support an imminent RTP stream and the terms are used interchangeably. An example of deletion of bandwidth includes releasing bandwidth at the end of an RTP stream and the terms are used interchangeably.

The Soft Switch 22 includes traditional Session Initiation Protocol (SIP) proxy functions for: i) receiving and forwarding SIP messages from a supported client (for example VoIP Device 12) to other SIP proxies (not shown) and/or a remote endpoint VoIP device 13 supported by the Soft Switch 22; and ii) receiving and forwarding SIP messages from other SIP proxies and/or a remote endpoint VoIP device 13 to the supported client (for example VoIP Device 12).

A network 20 comprises one or more IP complaint networks supporting the exchange of IP traffic between the CMTS 18 and each of the Soft Switch 22 and the remote VoIP device 13. The networks may include private backbones, such as a backbone network operated by the cable service provider, or Internet Service Provider (ISP) networks, and Internet backbone networks interconnected the networks of various ISPs.

In accordance with a first aspect of the present invention, the VoIP device 12 includes a DQoS control module 314 and DQoS (Dynamic Service Flow addition, change, and deletion of bandwidth reservation on the HFC network 16) is provided by the cable modem 300 in response to DQoS control by the VoIP device 12.

In accordance with a second aspect of the present invention, the cable modem 300 includes a DQoS control module 304 and DQoS (Dynamic Service Flow addition, change, and deletion of bandwidth reservation on the HFC network 16) is provided by the Cable Modem 300 in response to application layer gateway detection of SIP signaling between the VoIP device 12 and the Softswitch 22.

For either aspect, the cable modem 300 includes, as embedded components, the LAN System 312, the DOCSIS system 310, and the DQoS module 302. The DOCSIS system 310 is a traditional cable modem system operating in compliance with DOCSIS to exchange data over the HFC network 16 with the CMTS 18—including the relay of Common Open Policy Service (COPS) messages between the DQoS module 302 (which operates as the Policy Decision Point (PDP) for the VoIP device 12) and the CMTS 18 operating as the Policy Enforcement Point (PEP) for providing DQoS for the VoIP device 12.

Figure 2:
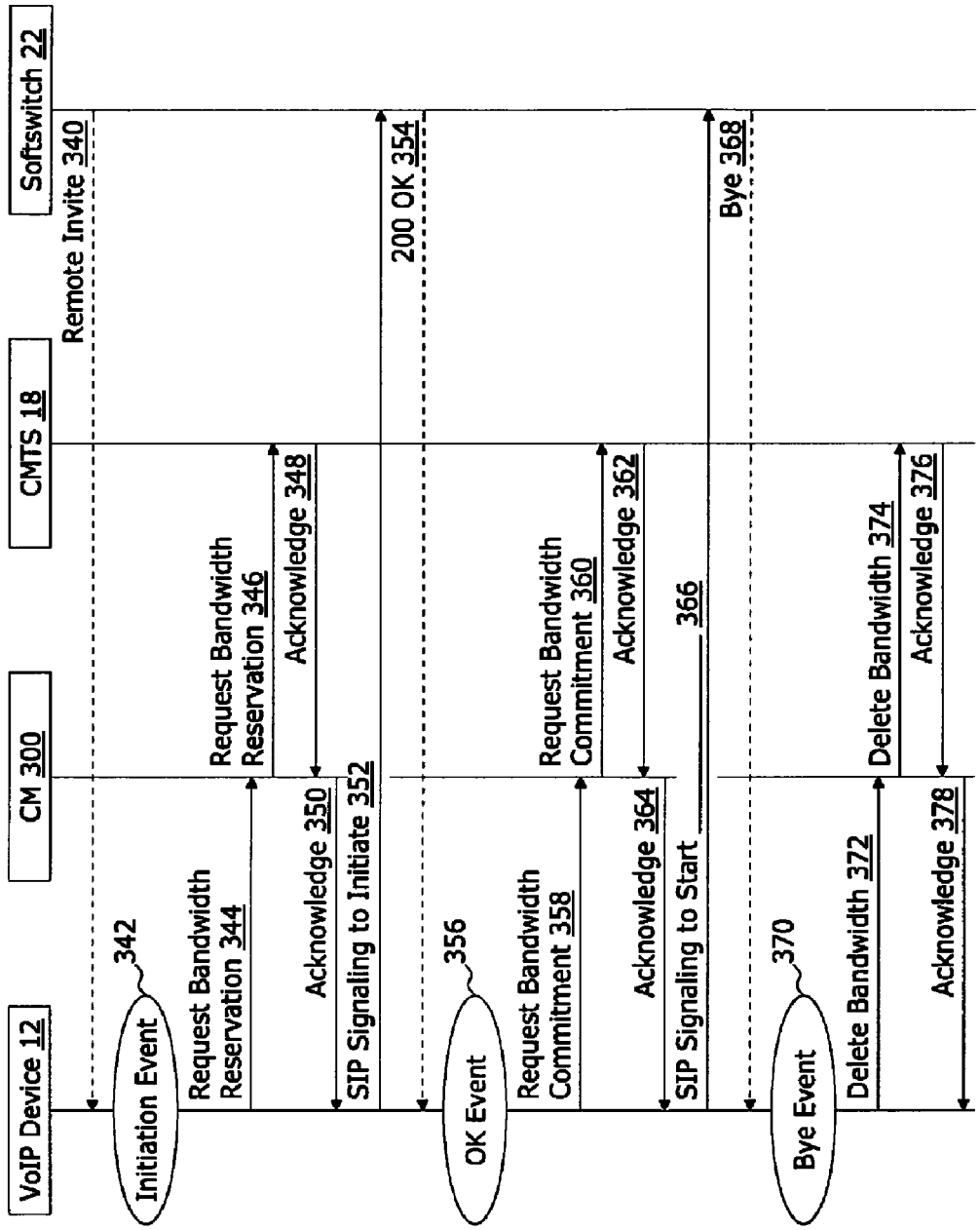
FIG. 2 is a ladder diagram representing signaling in accordance with an aspect of the present invention.

Referring to the ladder diagram of FIG. 2 in conjunction with FIG. 1, the first aspect of the invention wherein the VoIP device 12 includes a DQoS control module 314 for reserving, committing, and releasing bandwidth on the network 16 is represented.

The DQoS control module 314 of the VoIP device 12 sends a request bandwidth reservation message 344 to the LAN messaging module 306 of the DQoS module 302 of the Cable Modem 300 upon either receiving an Invite Message 340 from the Soft Switch 22 (indicating a remote caller calling into the VoIP Device 12) or upon an initiation event 342 occurring at the VoIP device 12 (such as the phone being taken off-hook).

In response to the request bandwidth reservation message 344, the CMTS messaging 308 of the DQoS module 302 of the cable modem 300 sends a request bandwidth reservation message 346 to the CMTS 18; the CMTS provides an acknowledgment 348 to the cable modem 300; and the cable modem 300 provides an acknowledgement 350 to the VoIP Device 12. Messages 344 and 350 may be IP messages routable on the local area network identifying, respectively, the request or the acknowledge. Messages 346 and 348 may be standard DOCSIS Mac layer messaging for reservation of dynamic service flows.

After receiving the acknowledgment 350, and only after receiving the acknowledgement 350 indicating that bandwidth has been reserved, the SIP module 37 of the VoIP device initiates the applicable SIP signal 352 to initiate the call. If the request for bandwidth 344 was in response to a remote invite message 340, the SIP message 352 may be a SIP Trying message if the bandwidth request was in response to receipt of a SIP invite from the soft switch 22. If the request for bandwidth 344 was in response to a local event 342, the SIP message 352 may be a SIP invite to the Soft Switch specifying a remote destination endpoint.

The DQoS control module 12 of the VoIP device 12 sends a request bandwidth change or commitment message 358 to the LAN messaging module 306 of the DQoS module 302 of the Cable Modem 300 upon either receiving a SIP 200 OK message 354 from the Soft Switch 22 (indicating a remote VoIP Device 13 is ready to commence a media session) or upon a local OK event 356 indicating that the VoIP device 12 is ready to commence a media stream (such as the person answering the telephone).

In response to the request bandwidth commitment message 358, the CMTS messaging 308 of the DQoS module 302 of the cable modem 300 sends a request bandwidth change or commitment message 360 to the CMTS 18; the CMTS provides an acknowledgment 362 to the cable modem 300; and the cable modem 300 provides an acknowledgement 364 to the VoIP Device. Messages 358 and 364 may be IP messages routable on the local area network. Messages 360 and 362 may be standard DOCSIS Mac layer messaging for reservation of dynamic service flows.

After receiving the acknowledgment 364, and only after receiving the acknowledgement 364 indicating that bandwidth has been committed for the RTP stream, the SIP module 37 of the VoIP device initiates the applicable SIP signal 366 to initiate the RTP stream. If the request for bandwidth commitment 358 was in response to a remote SIP OK message 354, the SIP message 366 may be a SIP ACK message. If the request for bandwidth commitment 358 was in response to a local Ok event 356, the SIP message 366 may be a SIP 200 OK message sent to the Soft Switch 22.

The DQoS control module 12 of the VoIP device 12 sends a request bandwidth deletion or release message 372 to the LAN messaging module 306 of the DQoS module 302 of the Cable Modem 300 upon either receiving SIP Bye message 368 from the Soft Switch 22 (indicating remote tear down of the RTP stream) or upon a local bye event 370 occurring at the VoIP device 12 (such as the phone being hung up).

In response to the request bandwidth deletion or release message 3372, the CMTS messaging 308 of the DQoS module 302 of the cable modem 300 sends a request bandwidth deletion message 374 to the CMTS 18; the CMTS provides an acknowledgment 376 to the cable modem 300; and the cable modem 300 provides an acknowledgement 378 to the VoIP Device. Messages 372 and 378 may be IP messages routable on the local area network. Messages 374 and 376 may be standard DOCSIS Mac layer messaging for DQoS deletion of bandwidth.

Figure 3:
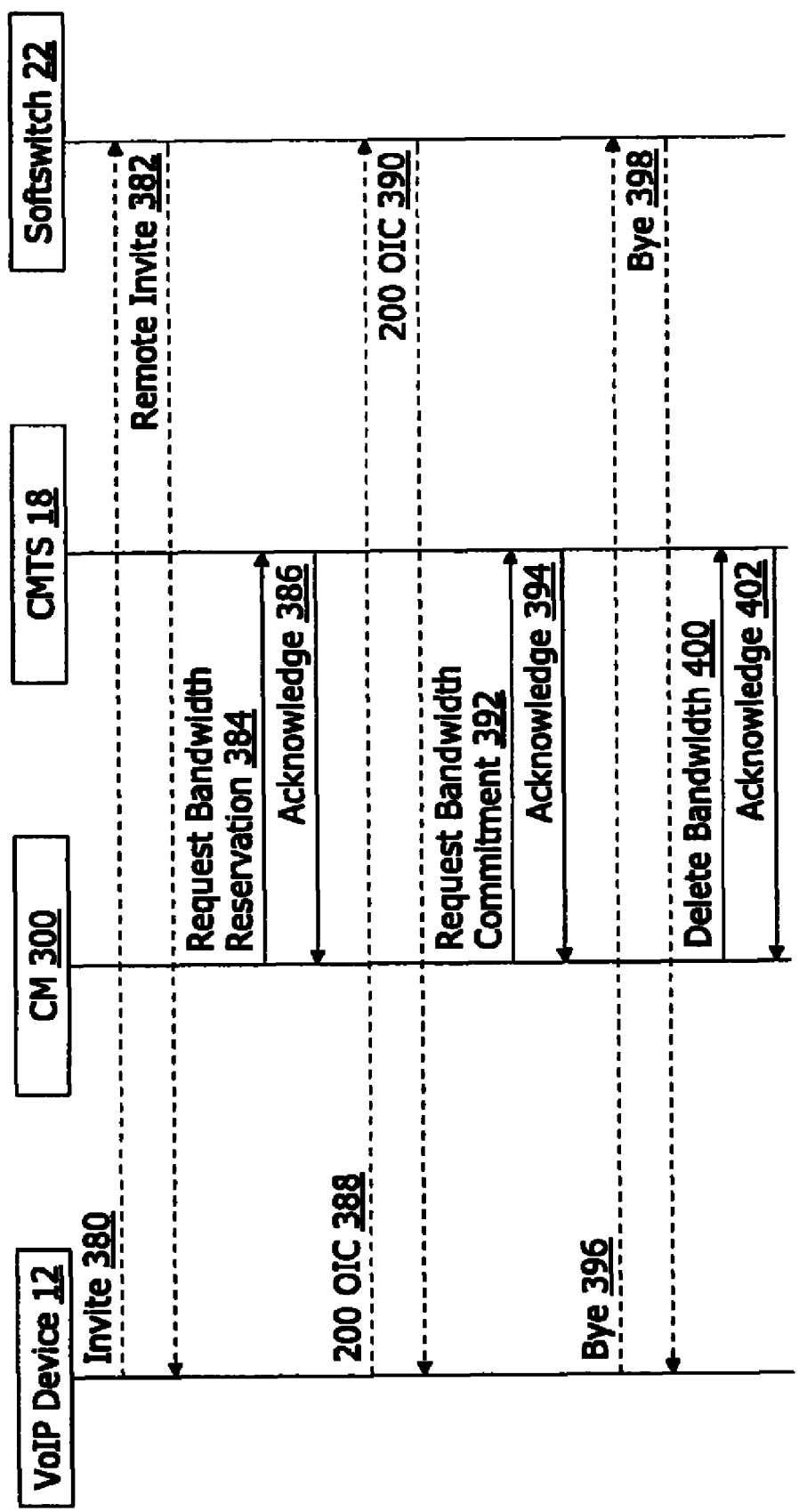
FIG. 3 is a ladder diagram representing signaling in accordance with another aspect of the present invention.

Referring to the ladder diagram of FIG. 3 in conjunction with FIG. 1, the second aspect of the invention is represented wherein the DQoS module 302 of the cable modem 300 includes a DQoS control module 304, including application layer gateway (ALG) functions, for recognizing SIP messaging between the VoIP 12 and the soft switch 22, and in response to detecting certain SIP messages, adding/reserving, changing/committing, and deleting/releasing bandwidth on the network 16 on behalf of the VoIP device 12.

For purposes of distinguishing ALG functionality from traditional NAT functionality, it should be appreciated that the NAT 27 only replaces source and destination IP address and port numbers in the headers of an IP frame when forwarding a frame, the substantive data (i.e. the payload) is not recognized or altered—simply re-addressed for routing. The term payload means the application level information content of a frame which remains unaltered when header information for lower layer systems (i.e. IP headers altered by the NAT server) are altered for purposes of transporting the application level information to its destination. The ALG compares the payload of the frame, at the application layer, to characteristics of the SIP messages to determine whether the frame is a SIP message, the type of SIP message, or data other than a SIP message.

The DQoS control module 304 of the cable modem 300 initiates a bandwidth addition or reservation message 384 to the CMTS 18 upon detecting that either the VoIP device 12 has sent a SIP Invite message 380 to the Soft Switch 22 or that the Soft Switch 22 has sent a SIP Invite message 382 to the VoIP device—in each case indicated that a VoIP call is to be set up. In response to the bandwidth addition or reservation message 384, the CMTS returns and acknowledgment 386. Messages 384 and 386 may be standard DOCSIS MAC layer messaging for addition or reservation of dynamic service flows.

The DQoS control module 304 of the cable modem 300 initiates a bandwidth change or commitment message 392 to the CMTS 18 upon detecting that either the VoIP device 12 has sent a SIP OK message 388 to the Soft Switch 22 or that the Soft Switch 22 has sent a SIP OK message 390 to the VoIP device—in each case indicating that an RTP stream in imminent. In response to the bandwidth change or commitment message 392, the CMTS returns and acknowledgment 394. Messages 392 and 394 may be standard DOCSIS Mac layer messaging for reservation of dynamic service flows.

The DQoS control module 304 of the cable modem 300 initiates a bandwidth deletion or release message 400 to the CMTS 18 upon detecting that either the VoIP device 12 has sent a SIP Bye message 396 to the Soft Switch 22 or that the Soft Switch 22 has sent a SIP Bye message 398 to the VoIP device—in each case indicating that reserved and committed bandwidth is no longer needed. In response to the bandwidth deletion message 400, the CMTS returns and acknowledgment 402. Messages 400 and 402 may be standard DOCSIS Mac layer messaging for reservation of dynamic service flows.

It should be appreciated that in the aspect described with respect to FIG. 2, wherein the VoIP device 12 controls reservation, commitment, and deletion of bandwidth, the VoIP device 12 may delay sending SIP messages until bandwidth has been appropriate reserved or committed. In the aspect describe with respect to FIG. 3, SIP messaging occurs between the VoIP device 12 and the Soft Switch 22 independent of the process used by the control module 304 to reserve and commitment dynamic service flows.

Figure 4:
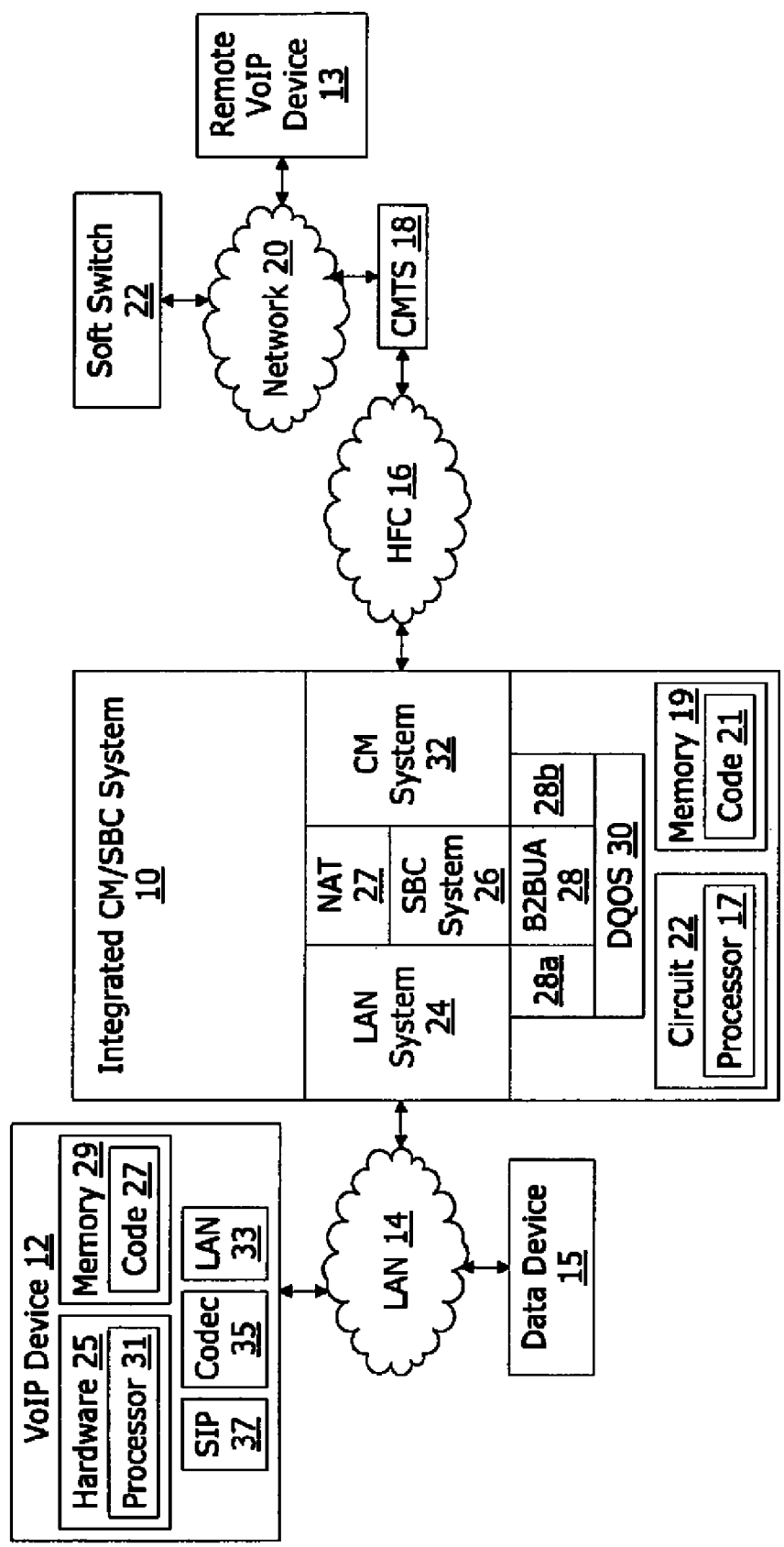
FIG. 4 is an architecture diagram representing yet another aspect of the present invention.

Referring to FIG. 4, in another aspect of the present invention, an integrated Cable Modem Session Border Controller (CM/SBC) may provide Dynamic Quality of Service (DQoS) for a Voice over Internet Protocol (VoIP) device 12: i) which is coupled to a local area network (LAN) 14 supported by the CM/SBC 10; and ii) which lacks the ability to request dynamic service flow allocation and commitment of resources from a Cable Modem Termination System (CMTS) 18 managing resources within a Hybrid Fiber/Cable (HFC) network 16 operating pursuant to the Data over Cable Service Interface Specification (DOCSIS). In this aspect, the CM/SBC utilizes a Back to Back User Agent (B2BUA) 28 to assure that bandwidth is reserved and committed prior to completing the SIP signaling to set up the RTP stream.

With reference to FIG. 4, each of the following elements of an integrated Cable Modem/Session Border Controller (CM/SBC) 10 may be implemented as a combination of hardware circuits 23 and code 21 (i.e. processing steps) stored in a volatile or non-volatile memory 19 executed by the hardware circuits 23, inclusive of a processor 17: i) a Local Area Network (LAN) system 24, ii) a Network Address Translation (NAT) system 27; iii) a Cable Modem (CM) system 32; and iv) a Session Border Controller (SBC) system 26. The SBC 26 includes a back-to-back user agent 28 (with a public user agent half 28b implemented back-to-back with a local user agent half 28a) and a DQoS module 30.

In accordance with an aspect of the present invention, Dynamic Quality of Service (DQoS) is provided by the CM/SBC for a Voice over Internet Protocol (VoIP) device 12: i) which is coupled to a local area network (LAN) 14 supported by the CM/SBC 10; and ii) which lacks the ability to request dynamic service flow allocation and commitment of resources from a Cable Modem Termination System (CMTS) 18 managing resources within a Hybrid Fiber/Cable (HFC) network 16 operating pursuant to the Data over Cable Service Interface Specification (DOCSIS). The VoIP device 12, the LAN 14, the HFC 16, the CMTS 18 and the Soft Switch 22, and network 20 are, in this aspect, similar to as described in previous aspects.

The CM/SBC 10 includes, as embedded components, the LAN System 24, the NAT Server 27, a cable modem system 32, the Session Border Control (SBC) system 26. The SBC 26 includes the back-to-back user agent 28 and the DQoS Module 30.

The CM 32 is a traditional cable modem system operating in compliance with DOCSIS to exchange data over the HFC network 16 with the CMTS 18—including the relay of Common Open Policy Service (COPS) messages between the DQoS module 30 (which operates as the Policy Decision Point (PDP) for the VoIP device 12) and the CMTS 18 operating as the Policy Enforcement Point (PEP) for providing DQoS for the VoIP device 12.

The NAT 27 is a traditional network address translation server which obtains an Internet routable IP address (the CM/SBC public IP address) from a DHCP server managed by the ISP operating the HFC network 16 and, for each outbound IP frame (i.e. a frame initiated by a device coupled to the LAN 14): i) stores the source IP address and port number of the frame in a record in the table; ii) replaces the source IP address and port number with the CM/SBC public IP address and an assigned port number and forwards the frame to the CM for communication over the HFC 16 and other networks comprising the Internet 20; and iii) records the assigned port number in the record in its NAT table such that it is associated with the source IP address and port number. For each inbound IP frame (i.e. a frame initiated by a remote device addressed to the CM/SBC public IP address): i) locates the record in the table with an assigned port number which matches the destination port number of the inbound frame; and iii) replaces the destination IP address and port number of the inbound frame with the source IP address and port number from the matching record; and ii) forwards such frame to the LAN system 24 for routing to its destination on the LAN 14.

For purposes of distinguishing the foregoing NAT functionality with the SBC system described herein, it should be appreciated that the NAT 27 only replaces source and destination IP address and port numbers in the headers of an IP frame when forwarding a frame, the substantive data (i.e. the payload) is not altered—simply re-addressed for routing. The SBC 26 intercepts and performs its functions based on the payload of a frame—even altering the payload of the frame such that the SBC 26 becomes the endpoint of a first VoIP session with the VoIP device 12 and an endpoint of a second, back to back, VoIP session with the remote VoIP device 13.

As discussed, the SBC 26 includes the B2BUA 28 and a DQoS module 30. The B2BUA 28 includes a local user agent half 28a back-to-backed with a public user agent half 28b for supporting VoIP sessions between the VoIP device 12 and a remote VoIP device 13 coupled to the Internet 20.

More specifically, the local user agent half 28a provides for set up (using SIP signaling) and maintenance of a local RTP stream for a local call segment with the VoIP device 12 across the LAN 14 and the public user agent half 28b provides for set up (using SIP signaling) and maintenance of a remote RTP stream for a remote call segment with the remote VoIP device 13 across the HFC 16 and Internet 20.

The DQoS module 30 obtains DQoS allocation and commitment of resources from the CMTS 18 for the remote call segment as a precondition to initiating the local and remote RTP streams.

Figure 5:
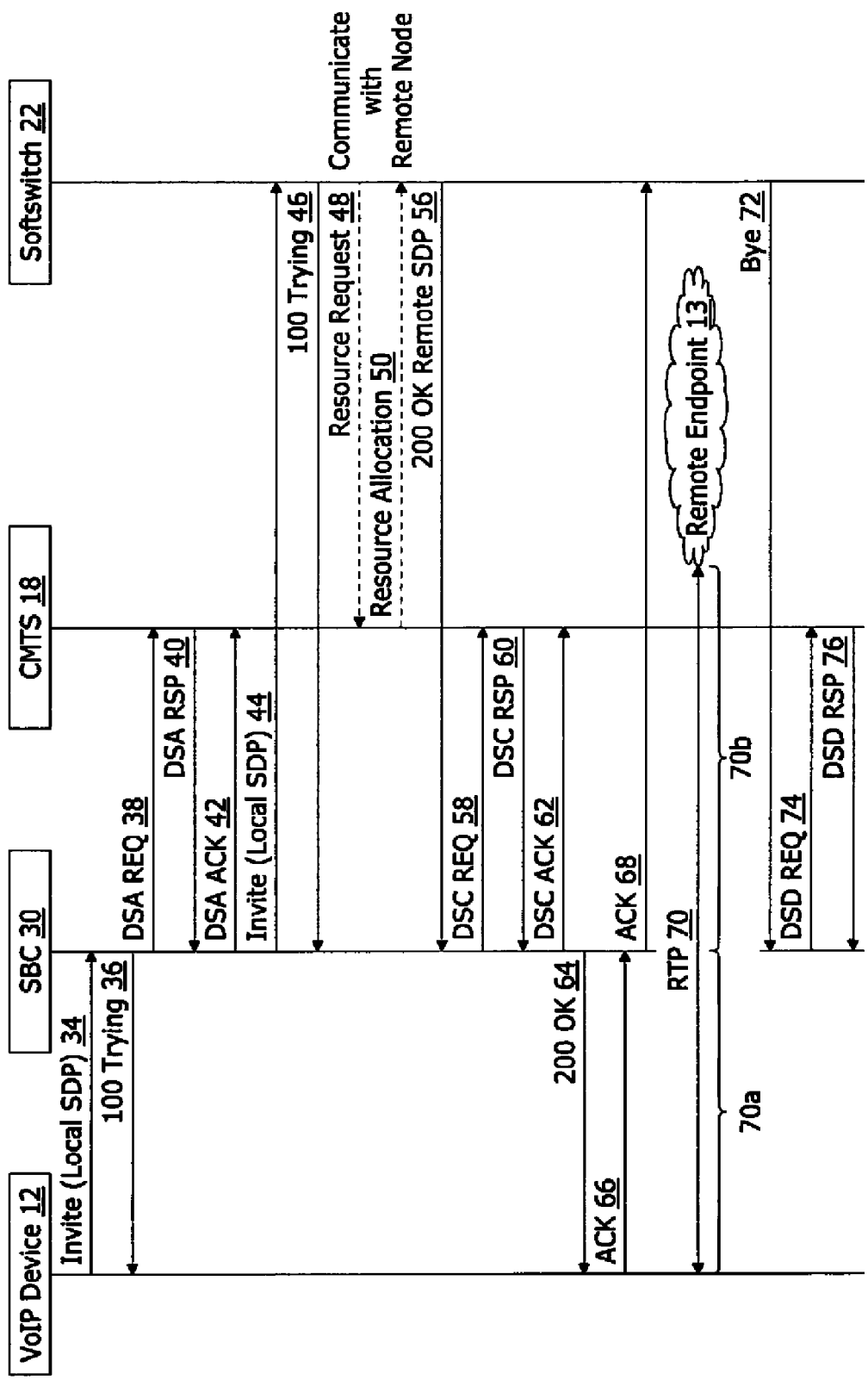
FIG. 5 is a ladder diagram representing signaling in accordance with an aspect of the present invention.
Figure 7:
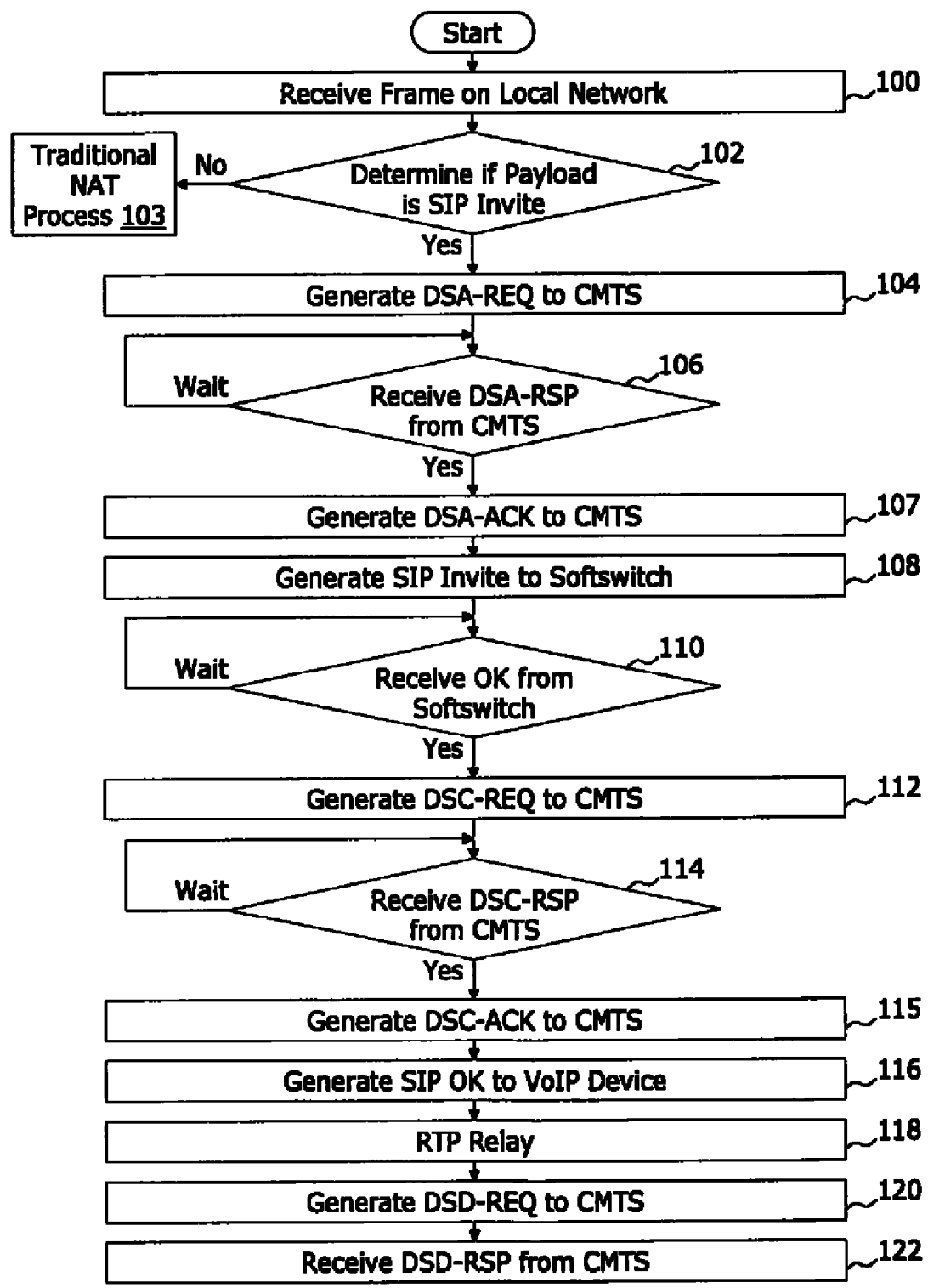
FIG. 7 is a flow chart representing exemplary operation of a session border controller in accordance with an aspect of the present invention.

FIG. 5 is a ladder diagram which represents signaling to set up an outbound RTP stream (i.e. and RTP stream initiated by the VoIP device 12 on the LAN 14) and the flow chart of FIG. 7 represents processing steps performed by the SBC 26 to initiate, receive, and otherwise perform such signaling as well as obtain DQoS allocation and commitment of resources.

Referring to FIG. 7 in conjunction with FIG. 5, step 100 of the flow chart represents the SBC 26 receiving an IP frame 33 (FIG. 9) with a payload comprising a SIP Invite message 34.

Figure 9:
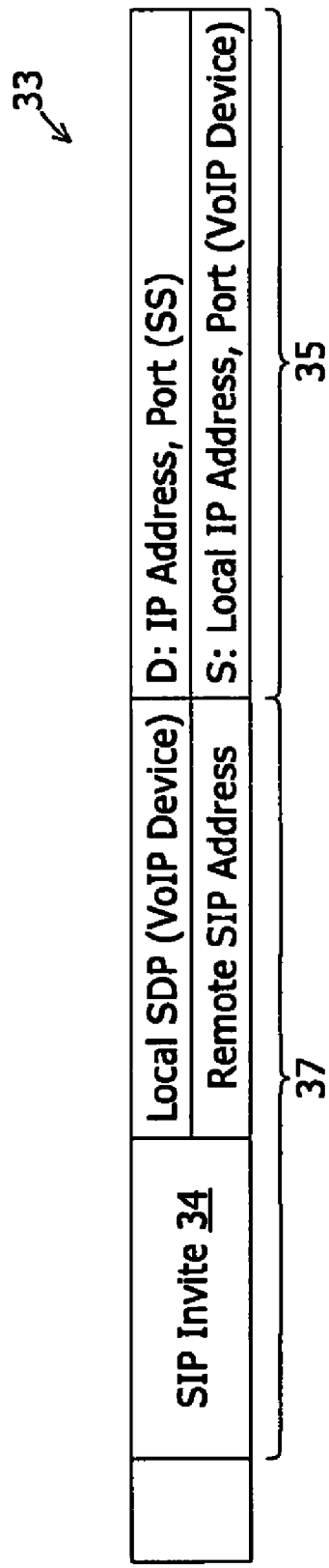
FIG. 9 is a diagram representing an IP frame in accordance with an aspect of the present invention.

Turning briefly to FIG. 9, the frame 33 includes an IP header 35 which specifies a source IP address and port number of the VoIP device 12 and a destination IP address and port number of the Soft Switch 22. A payload 37 of the frame 33 includes the SIP invite message 34. The SIP invite message 34 includes specification of: i) the local Session Description Protocol (SDP) of the VoIP device 12; and ii) the SIP Address of the remote (i.e. intended) destination endpoint VoIP device 13. The frame 33 is transmitted by the VoIP device 12 to the SBC 30 via the local area network 14 (FIG. 4)—which implicitly includes routing of the IP frame by the LAN System 24 to the CM/SBC operating as a gateway.

Although the ladder diagram of FIG. 5 represents a SIP invite message 34 within the payload 37 of the frame 33, the SBC also receives frames with payload other than a SIP invite message, for example frames with payloads of data from a data device 15 (FIG. 4). As such, step 102 of the flow chart represents the SBC 26 determining whether the frame 33 includes a SIP invite message 34 for example by comparing the payload 37 of the frame to characteristics of a SIP invite message.

If the frame 33 includes payload 37 other than a SIP invite message (or other SIP signaling), it may undergo traditional IP address and port translation by the NAT 27 for routing on the Internet as represented by step 103.

If the frame 33 includes payload 37 that is a SIP Invite message 34, the DQoS module 30 (FIG. 4) of the SBC 26, in response to determining that the frame 33 includes a SIP invite message 34, generates a dynamic services addition Request (DSA-REQ) message 38 to the CMTS 18 as represented by step 104 of the flow chart. The local user agent half 28a of the B2BUA 28 may also send a SIP 100 Trying message 36 to the local VoIP device 12.

Step 106 of the flow chart represents the SBC 26 waiting to receive, and receiving, a dynamic services addition response (DSA-RSP) message 40 from the CMTS 18.

In response to receiving the DSA-RSP 40, the SBC 26 generates a dynamic services addition Acknowledge (DSA-ACK) message 42 to the CMTS 18 as represented by step 107 of the flow chart.

Each of the DSA-REQ 38, the DSA-RSP 40, and the DSA-ACK 42 may be COPS messages with the DQoS module operating as the PDP for the VoIP device 12 and the CMTS operating as the PEP.

Also in response to receiving the DSA-RSP 40, and only after receiving the DSA-RSP 40, the public user agent half 28b of the B2BUA 28 of the SBC 26 generates a IP frame 43 (FIG. 10) with a payload 47 (FIG. 10) comprising a corresponding SIP Invite message 44 (FIG. 5) to the Soft Switch 22 as represented by step 108 of the flow chart.

Figure 10:
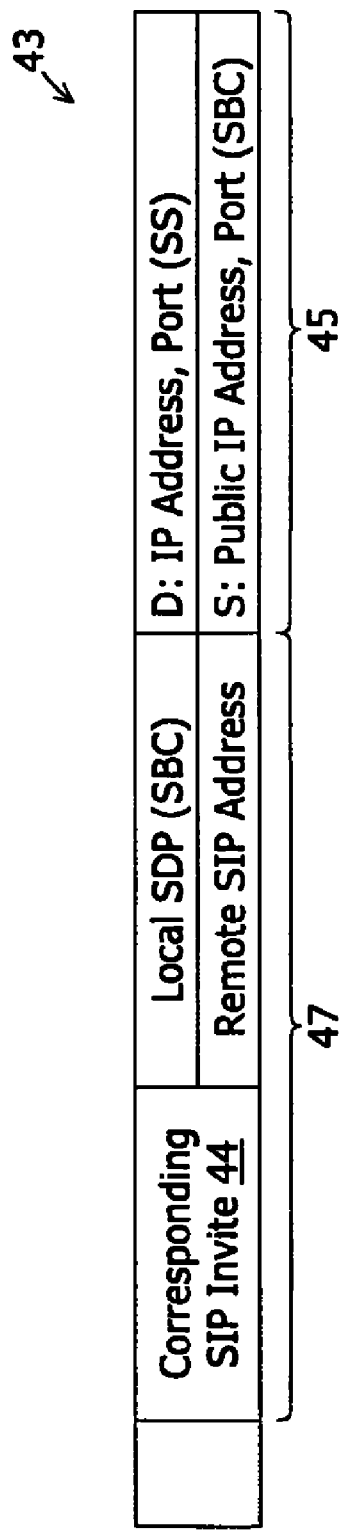
FIG. 10 is a diagram representing an IP frame in accordance with an aspect of the present invention.

Referring briefly to FIG. 10, the frame 43 includes an IP header 45 which specifies a source IP address and port number of the SBC 30 (i.e. the CM/SBC public IP address assigned by the Internet Service Provider) and a destination IP address and port number of the Soft Switch 22. The payload 47 of the frame 43 includes the corresponding SIP invite message 44. The corresponding SIP invite message 44 includes specification of: i) the local Session Description Protocol (SDP) of the B2BUA 28 of the SBC system 25; and ii) the SIP Address of the remote (i.e. intended) destination endpoint VoIP device 13.

The frame 43 with the corresponding SIP Invite message 44 is transmitted by the B2BUA 28 to the Soft Switch 22—via the HFC network 16 and the network 20 as represented by step 108.

In response to receiving the corresponding SIP Invite message, the Softswitch may generate a SIP 100 Trying message 46 back to the B2BUA 28, communicate the a remote node such as a proxy server supporting the remote endpoint 13 to obtain a remote SDP of the remote endpoint 13, and, if needed obtain allocation of bandwidth for the remote endpoint by, for example, requesting recourse allocation from a CMTS 18 (message 48) and obtaining allocation (message 50). These steps are useful in a system wherein a CMTS will not allocate bandwidth to a cable modem unless a gate ID has been assigned by the CMTS. Requesting and obtaining resource allocation includes obtaining a gate ID to return to the B2BUA.

Returning to the flow chart, step 110 represents the B2BUA 28 waiting for, and receiving a SIP 200 OK message 56 with a remote SDP from the Soft Switch 22.

In response to receiving the SIP 200 OK message 56, and only after receiving the SIP 200 OK message 56, the DQoS module 30 of the SBC 26 generates a dynamic services change Request (DSC-REQ) message 58 to the CMTS 18 as represented by Step 112.

Step 114 of the flow chart represents the SBC 26 waiting to receive, and receiving, a dynamic services change response (DSC-RSP) message 60 from the CMTS 18.

In response to receiving the DSC-RSP 60, and only after receiving the DSC-RSP 60, the DQoS module 30 generates a dynamic services change Acknowledge (DSC-ACK) message 62 to the CMTS as represented by step 115 of the flow chart and the local user agent half 28a of the B2BUA 28 generates a 200 SIP OK message 64 to VoIP device 12 via the local area network 14 as represented by step 116 of the flow chart.

Thereafter, after appropriate acknowledge messages, at least some of which are represented on the ladder diagram by reference numerals 66 and 68, the real time protocol (RTP) stream 70 is commenced.

The RTP stream 70 comprises at least a first segment 70a and a second segment 70b. The first segment 70a is a RTP stream between the VoIP device 12 and a local user agent half 28a of the B2BUA 28 using the SDP of the VoIP device and the SDP of the local user agent half 28a of the B2BUA 28. The second segment 70b represents an RTP stream between a public user agent half 28b of the B2BUA 28 and the remote VoIP device 13 using the SDP of the public user agent half 28b of the B2BUA 28 and the SDP of the VoIP device 13.

Thereafter, in response to the B2BUA receiving a SIP Bye message, the committed bandwidth on the HFC network 16 is release by the DQoS module 30 transmitted a dynamic services deletion request (DSD-REQ) message 74 to the CMTS 18 as represented by step 120 of the flow chart and CMTS returning a dynamic service deletion response (DSD-RSP) message 76 for receipt by the DQoS module 30 as represented by step 122.

Figure 13:
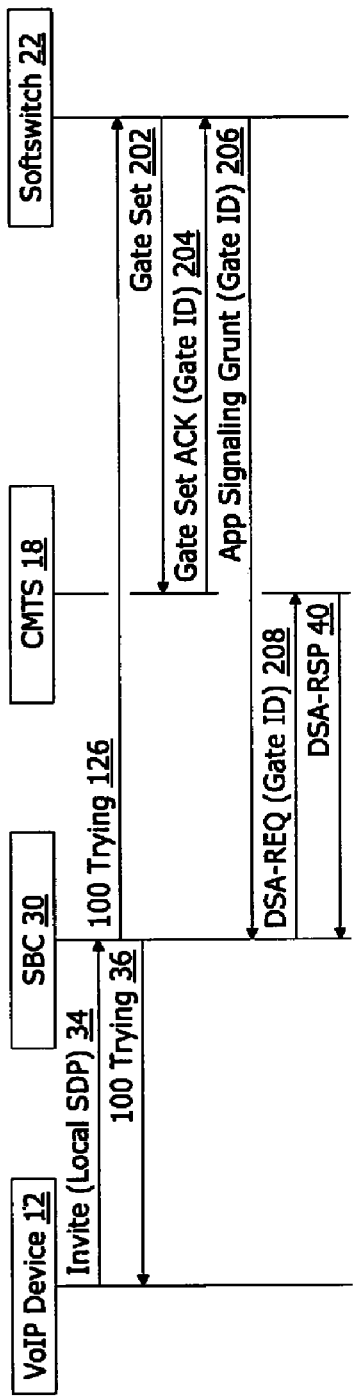
FIG. 13 is a ladder diagram representing signaling in accordance with yet another aspect of the present invention.
Figure 14:
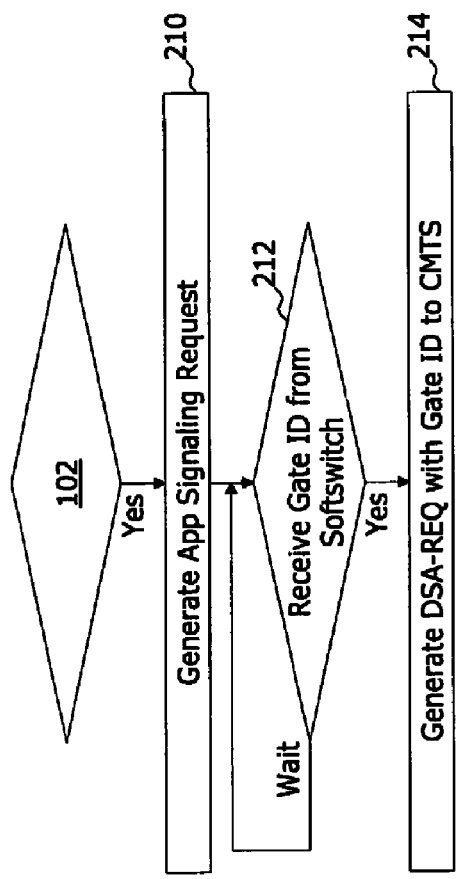
FIG. 14 is a flow chart representing exemplary operation of a session border controller in accordance with yet another aspect of the present invention.

Referring briefly to messaging of the ladder diagram of FIG. 13 and the flow chart of FIG. 14, in accordance with one aspect of the invention, additional steps may be performed to obtain a gate ID.

The additional steps are performed after receipt of the Invite message 34 as described with respect to FIGS. 5 and 7. Upon receipt of the Invite message 34, the public user agent half 28b of the B2BUA 28 generates an application signaling request 35 to the Softswitch 22 as represented by step 210 of the flow chart.

In response to receiving the application signaling request 35, the Softswitch 22 generates a Gate Set message 202 to the CMTS 18 and receives a Gate Set Acknowledge message 204 in response. The Gate Set Acknowledge message 204 includes a DQoS Gate ID assigned by the CMTS.

After receiving the Gate Set Acknowledge message 204, the Softswitch 22 returns an Application Signaling Grant message 206, which includes the Gate ID to the SBC 30. Step 212 of the flow chart represents the B2BUA 28 waiting for, and receiving, the Application Signaling Grant message 206 from the Softswitch 22.

In response to receiving the Application Signaling Grant message 206, and only after receiving the Application Signaling Grant message 206, the DQoS module 30 generates a DSA-REQ message 208, which includes the Gate ID, to the CMTS as represented by step 214 of the flow chart.

Step 214 and DSA-REQ 208 are the same as Step 104 (FIG. 7) and DSA-REQ 38 (FIG. 5) with the exception that the DQoS module includes the Gate Id in DSA-REQ 208 at step 214. Thereafter, the process continues as described with respect to FIG. 5 and FIG. 7.

Inbound Call

Figure 6:
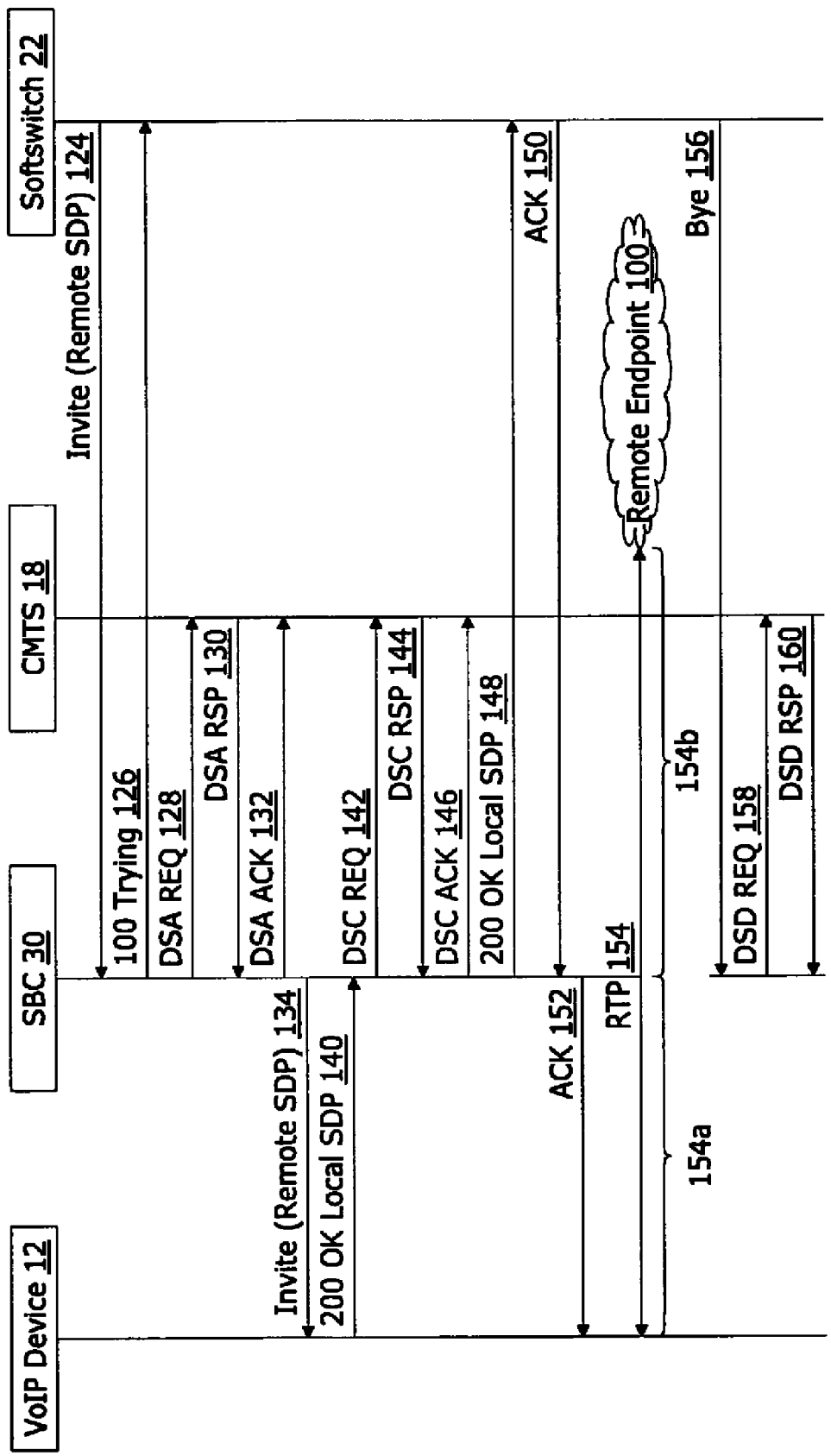
FIG. 6 is a ladder diagram representing signaling in accordance with another aspect of the present invention.
Figure 8:
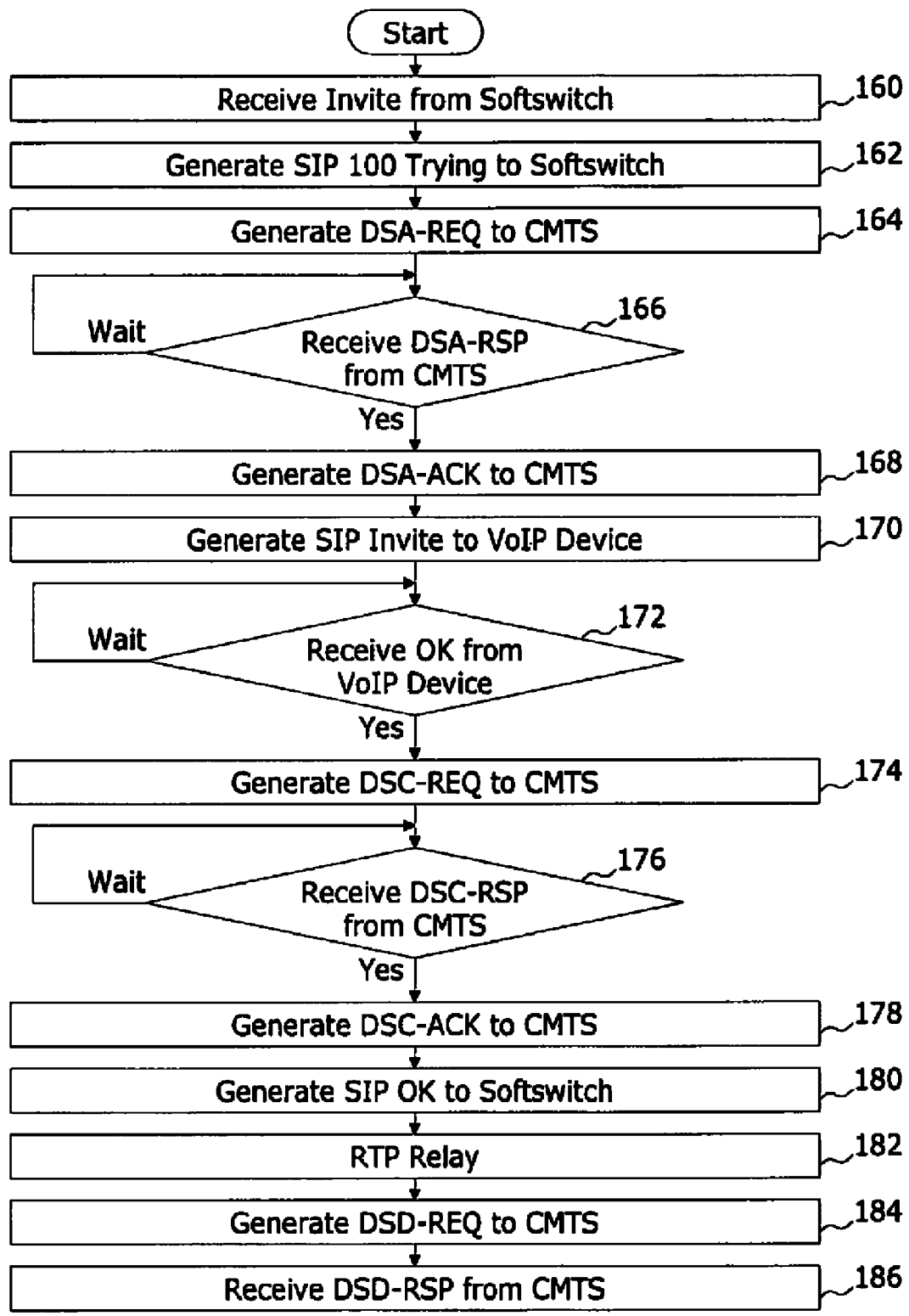
FIG. 8 is a flow chart representing exemplary operation of a session border controller in accordance with another aspect of the present invention.

FIG. 6 is a ladder diagram representing signaling to set up an inbound RTP stream (i.e. and RTP stream initiated by a remote VoIP device, such as device 13, to the VoIP device 12 on the LAN 14) and the flow chart of FIG. 8 represents steps performed by the SBC 26 to initiate, receive, and otherwise perform such signaling.

Referring to FIG. 8 in conjunction with FIG. 6, step 160 of the flow chart represents the SBC 30 receiving an IP frame 190 (FIG. 11) with a payload comprising a SIP Invite message 124.

Figure 11:
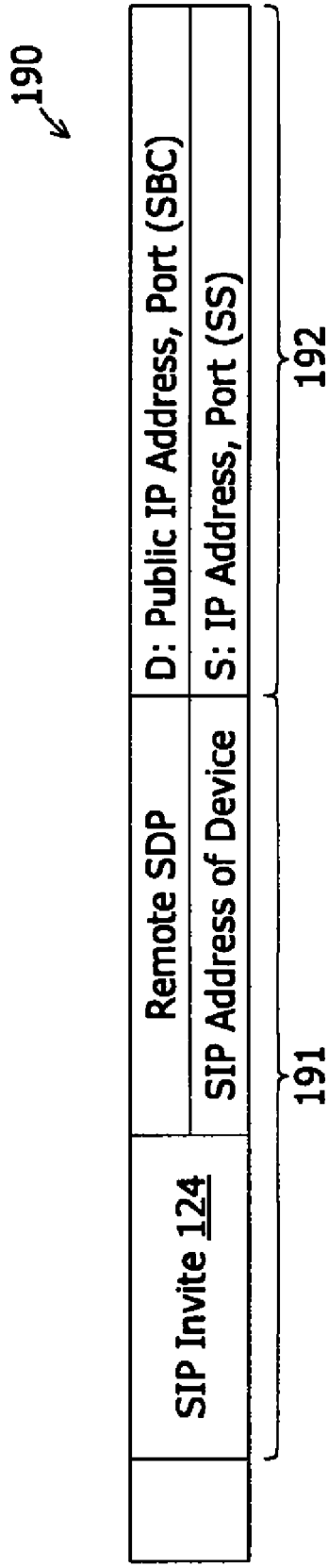
FIG. 11 is a diagram representing an IP frame in accordance with an aspect of the present invention.

Turning briefly to FIG. 11, the frame 190 includes an IP header 192 which specifies a source IP address and port number of the Soft Switch 18 and a destination IP address and port number of the SBC 30. A payload 191 of the frame 190 includes the SIP invite message 134. The SIP invite message 124 includes specification of: i) the remote Session Description Protocol (SDP) of the initiating device (remote VoIP device 13); and ii) the SIP Address of the destination endpoint which, because the VoIP device 12 is on a local area network, is the SIP address of the public user agent half 28b of the B2BUA 28 (i.e. the public IP address of the SBC 30).

In response to receiving the SIP Invite: i) the public user agent half 28b of the B2BUA 28 generates a SIP 100 trying message to the Soft Switch 22 as represented by step 162 of the flow chart; and ii) the DQoS module 30 (FIG. 4) of the SBC 26, generates a dynamic services addition Request (DSA-REQ) message 128 to the CMTS 18 as represented by step 162 of the flow chart.

Step 166 of the flow chart represents the SBC 26 waiting to receive, and receiving, a dynamic services addition response (DSA-RSP) message 40 from the CMTS 18.

In response to receiving the DSA-RSP 40, the SBC 26 generates a dynamic services addition Acknowledge (DSA-ACK) message 132 to the CMTS 18 as represented by step 168 of the flow chart.

Again, each of the DSA-REQ 38, the DSA-RSP 40, and the DSA-ACK 42 may be COPS messages with the DQoS module 30 operating as the PDP for the VoIP device 12 and the CMTS operating as the PEP.

Also in response to receiving the DSA-RSP 130, and only after receiving the DSA-RSP 130, the local user agent half 28a of the B2BUA 28 generates an IP frame 193 (FIG. 12) with a payload 194 comprising a corresponding SIP Invite message 134 (FIG. 6) to the VoIP device 12 as represented by step 170 of the flow chart.

Figure 12:
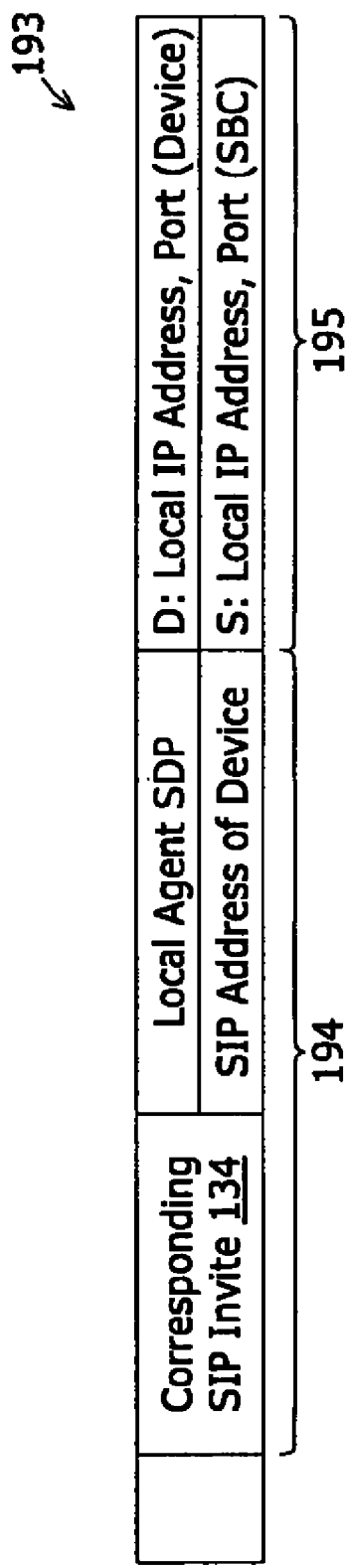
FIG. 12 is a diagram representing an IP frame in accordance with an aspect of the present invention.

Referring briefly to FIG. 12, the frame 193 includes an IP header 195 which specifies a source IP address (i.e. local IP address of SBC) and port number of the local user agent half 28a of the B2BUA 28 and a destination local IP address and port number of the VoIP Device. The payload 194 of the frame 193 includes the corresponding SIP invite message 134. The corresponding SIP invite message 134 includes specification of: i) the Session Description Protocol (SDP) of the local user agent half 28a of the B2BUA 28; and ii) the local SIP Address of the VoIP device 12.

Step 172 represents the B2BUA 28 waiting for, and receiving a SIP 200 OK message 140 with a Session Description Protocol (SDP) from the local VoIP device 12.

In response to receiving the SIP 200 OK message 140, and only after receiving the SIP 200 OK message 140, the DQoS module 30 of the SBC 26 generates a dynamic services change Request (DSC-REQ) message 142 to the CMTS 18 as represented by Step 174.

Step 176 of the flow chart represents the SBC 26 waiting to receive, and receiving, a dynamic services change response (DSC-RSP) message 144 from the CMTS 18.

In response to receiving the DSC-RSP 144, and only after receiving the DSC-RSP 144, the DQoS module 30 generates a dynamic services change Acknowledge (DSC-ACK) message 146 the CMTS as represented by step 178 of the flow chart and the B2BUA 28 generates a 200 SIP OK message 148 to the Soft Switch 22 as represented by Step 180 of the flow chart.

Thereafter, after appropriate acknowledge messages, at least some of which are represents on the ladder diagram by reference numerals 150 and 152, the real time protocol (RTP) stream 154 is commenced.

The RTP stream 154 comprises at least a first segment 154a and a second segment 154b. The first segment 154a is a RTP stream between the VoIP device 12 and a local user agent half 28a of the B2BUA 28 using the SDP of the VoIP device and the SDP of the local user agent half 28a of the B2BUA 28. The second segment 154b represents a RTP stream between a public user agent half 28b of the B2BUA 28 and the remote VoIP device 13 using the SDP of the public user agent half 28b of the B2BUA 28 and the SDP of the VoIP device 13.

Thereafter, in response to the B2BUA receiving a SIP Bye message, the committed bandwidth on the HFC network 16 is release by the DQoS module 30 transmitted a dynamic services deletion request (DSD-REQ) message 158 to the CMTS 18 as represented by step 184 of the flow chart and CMTS returning a dynamic service deletion response (DSD-RSP) message 160 for receipt by the DQoS module 30 as represented by step 186.

Although the invention has been shown and described with respect to certain preferred embodiments, it is obvious that equivalents and modifications will occur to others skilled in the art upon the reading and understanding of the specification. The present invention includes all such equivalents and modifications, and is limited only by the scope of the following claims.

What is claimed is:

1. A cable modem integrated session boarder control circuit coupled to:
   a voice over internet protocol (VoIP) device via a local area network; and
   a cable modem circuit (CM) for communication with a cable modem termination system (CMTS) via a Data-Over-Cable Service Interface Specification (DOCSIS) network;
   the session boarder control circuit comprising, as instructions stored in a memory and executed by a processor, a back to back user agent system (B2BUA) embedded with a DOCSIS dynamic quality of service system (DQoS);
   the B2BUA, in response to receiving a frame via the local area network, determining if the frame is a Session Initiation Protocol (SIP) invite message;

in response to the B2BUA determining that the frame is a SIP invite message, the DQoS:
i) generates a dynamic services addition Request message (DSA-REQ) to the CMTS; and
ii) generates a corresponding SIP invite message to a SIP proxy.

2. The system of claim 1, wherein:
generating the corresponding SIP invite message is subsequent to receiving a dynamic services addition response message (DSA-RSP) from the CMTS, the DSA-RSP being generated by the CMTS in response to the DSA-REQ.

3. The system of claim 2, wherein:
in response to the B2BUA receiving a SIP OK message from the SIP proxy:
i) the DQoS generates a dynamic service commit request (DSC-REQ) to the CMTS; and
ii) the B2BUA generates a corresponding SIP OK message to the VoIP device via the local area network.

4. The system of claim 3, wherein generating the corresponding SIP OK message is subsequent to receiving a dynamic services change response message (DSA-RSP) from the CMTS, the DSA-RSP being generated by the CMTS in response to the DSA-REQ.

5. The system of claim 1, wherein the instructions further comprise:
in response to the B2BUA determining that the frame includes a SIP invite message, the B2BUA further, generating an application signaling request message to a VoIP application server via the DOCSIS network; and
the DQoS including a gate identifier in the DSA REQ, the gate identifier:
i) being received in an application signaling acknowledge provided by the VoIP application server in response to the application signaling request message, and
ii) identifying a Dynamic Quality of Service (DQoS) gate allocated by the CMTS to the session border controller.

* * * * *